(12) United States Patent
Tudorache

(10) Patent No.: US 11,686,471 B2
(45) Date of Patent: Jun. 27, 2023

(54) APPARATUS FOR ENDOTHERMIC PROCESS WITH IMPROVED OUTER BURNERS ARRANGEMENT

(71) Applicant: L'Air Liquide, Societe Anonyme pour l'Etude et l'Exploitation des Procedes Georges Claude, Paris (FR)

(72) Inventor: Diana Tudorache, Bures sur Yvette (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 662 days.

(21) Appl. No.: 16/622,089

(22) PCT Filed: May 17, 2018

(86) PCT No.: PCT/EP2018/062994
§ 371 (c)(1),
(2) Date: Dec. 12, 2019

(87) PCT Pub. No.: WO2018/228777
PCT Pub. Date: Dec. 20, 2018

(65) Prior Publication Data
US 2020/0182455 A1    Jun. 11, 2020

(30) Foreign Application Priority Data
Jun. 14, 2017   (EP) .................................. 17176127

(51) Int. Cl.
*F23C 5/08*      (2006.01)
*F23C 13/00*     (2006.01)
(Continued)

(52) U.S. Cl.
CPC ................ *F23C 5/08* (2013.01); *F23C 13/00* (2013.01); *B01J 8/062* (2013.01); *C01B 3/384* (2013.01);
(Continued)

(58) Field of Classification Search
CPC . F23C 5/08; F23C 13/00; C01B 3/384; C01B 2203/0233; C01B 2203/0816; C01B 2203/1822; C01B 2203/1241
See application file for complete search history.

(56) References Cited

U.S. PATENT DOCUMENTS

2007/0128091 A1 * 6/2007 Gorval .................. C01C 1/0417
422/204
2011/0220847 A1 * 9/2011 Hendershot ............... F23C 5/08
252/373

(Continued)

FOREIGN PATENT DOCUMENTS

EP      2314543 A1 *  4/2011   .............. B01J 8/062
EP      2 369 229 A2    9/2011
(Continued)

OTHER PUBLICATIONS

International Search Report and Written Report for PCT/ EP2018/062994, dated Jul. 27, 2018.

*Primary Examiner* — Matthew J Merkling
(74) *Attorney, Agent, or Firm* — Justin K. Murray

(57) ABSTRACT

A furnace for performing an endothermic process, comprising tubes containing catalyst for converting gaseous feed, wherein tubes are positioned inside the furnace in rows parallel to refractory walls along X axis, wherein burners are mounted either to the furnace floor or to the furnace ceiling, inner burners being mounted in rows between the rows of tubes and outer burners being mounted in rows between tubes rows and the wall along X axis, and close to said wall along X axis, wherein the outer burners are positioned such (Continued)

that the distance b2w between the outer burner and the wall along X axis is smaller than or equal to equivalent burner nozzle diameter øb of said outer burner (b2w/øb≤1).

7 Claims, 12 Drawing Sheets

(51) Int. Cl.
    *C01B 3/38*     (2006.01)
    *B01J 8/06*     (2006.01)

(52) U.S. Cl.
    CPC .............. *C01B 2203/0233* (2013.01); *C01B 2203/0816* (2013.01); *C01B 2203/0822* (2013.01); *C01B 2203/1241* (2013.01); *F23C 2900/03002* (2013.01); *F23N 2237/02* (2020.01)

(56) References Cited

U.S. PATENT DOCUMENTS

| | | | |
|---|---|---|---|
| 2012/0126177 A1* | 5/2012 | Meissner | B01J 8/062 422/162 |
| 2015/0239736 A1* | 8/2015 | Martin | C01B 3/386 252/373 |
| 2017/0099141 A1 | 4/2017 | Wu et al. | |

FOREIGN PATENT DOCUMENTS

| | | |
|---|---|---|
| EP | 2 708 812 A1 | 3/2014 |
| EP | 2 913 586 A1 | 9/2015 |
| WO | 2013 052086 A2 | 4/2013 |

\* cited by examiner

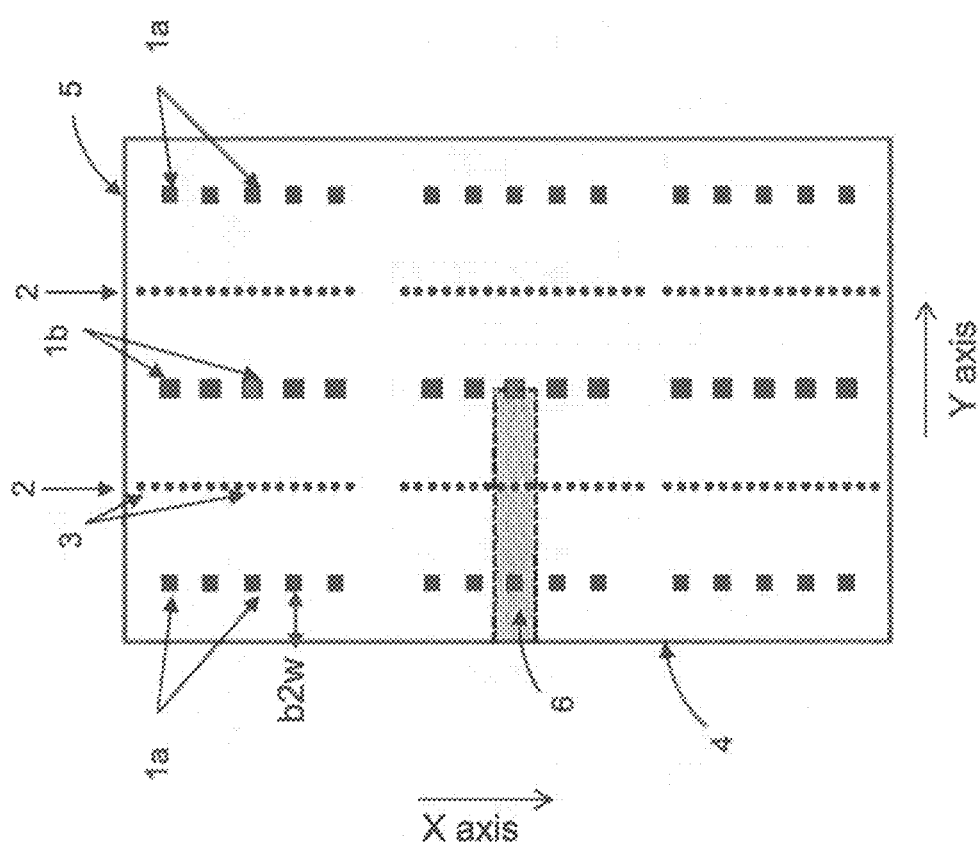

| N° ref | $\phi_b$ | b2w | $\dfrac{b2w}{\phi_b}$ | t2w | $\phi_t$ | $\dfrac{(b2w + \phi_b/2)}{t2w}$ | Bending |
|---|---|---|---|---|---|---|---|
| n1 | 0.3 | 0.05 | 0.16 | 1.7 | 0.148 | 0.12 | No |
| n2 | 0.3 | 0.3 | 1.00 | 1.5 | 0.148 | 0.3 | No |
| n3 | 0.3 | 0.3 | 1.00 | 2.0 | 0.148 | 0.23 | No |
| n4 | 0.3 | 0.4 | 1.33 | 2.1 | 0.148 | 0.26 | Yes |
| n5 | 0.3 | 0.4 | 1.33 | 1.5 | 0.148 | 0.37 | No |
| n6 | 0.3 | 0.4 | 1.33 | 1.5 | 0.148 | 0.23 | Yes |
| n7 | 0.3 | 0.5 | 1.66 | 2.4 | 0.148 | 0.30 | Yes |

Figure 7

APPARATUS FOR ENDOTHERMIC PROCESS WITH IMPROVED OUTER BURNERS ARRANGEMENT

CROSS REFERENCE TO RELATED APPLICATIONS

This application is a § 371 of International PCT Application PCT/EP2018/062994, filed May 17, 2018, which claims the benefit of EP17176127.3, filed Jun. 14, 2017, both of which are herein incorporated by reference in their entireties.

FIELD OF THE INVENTION

The present invention relates to the design of vertically fired furnaces suitable for endothermic processes such as steam methane reforming ("SMR") or hydrocarbon feedstock cracking, and to process using said furnaces.

BACKGROUND OF THE INVENTION

Although the following description will refer only to the SMR process, it applies as well to other endothermic processes that utilize the same type of reactors.

The SMR process is mainly based on the reforming reaction of methane that yields to a mixture of hydrogen ($H_2$) and carbon monoxide (CO) in the presence of water vapor. The reaction is endothermic and slow and requires additional heat input, as well as a catalyst to occur. Usually, SMR reactor performances are limited by the heat transfer and not by the kinetic of the reactions.

In conventional industrial practice, the SMR reactor usually comprises tubes placed in a furnace (also called firebox), said tubes being filled with catalyst—most often in the form of pellets—and fed with the process gas mixture (mainly methane and steam).

Several well-proven configurations are available for furnace design as illustrated by the FIG. 1 which presents down-fired (also known as top-fired or roof-fired), up-fired (also known as bottom-fired or floor-fired), side fired and terrace wall reformers.

The top fired technology is one of the most referenced designs and is proposed by several technology providers; the bottom-fired technology is less common in modern plants.

Both top-fired and bottom-fired furnaces are typically made of a refractory lined firebox containing several rows of catalyst containing tubes.

According to the top-fired technology, the necessary heat for the endothermic process is provided by roof burners placed in rows between the tubes, and also by rows of additional roof burners at the furnace side, along the longitudinal walls of the furnace. The combustion products are usually blown out of the burners, vertically downwards, so that the tubes face the flames in their upper part. The process feed is fed downwards, in co-current flow with the burned gases. A flue gas exhaust collector is usually provided at the furnace floor level.

According to the bottom-fired technology, the burners are installed on the floor of the firing area and fire vertically upwards. The combustion products are blown out of the burners, vertically upwards, so that the tubes face the flames in their lower part. The process feed can be fed either downwards, in counter-current flow with the burned gases, or upwards, in co-current flow with the burned gases. A flue gases exhaust collector is usually provided at the furnace roof level. The necessary heat for the endothermic process is provided by floor-fired burners placed in rows between the tubes, and also by rows of additional floor-fired burners at the furnace side, along the longitudinal walls of the furnace.

In both top-fired and bottom-fired furnaces, the outer rows of burners situated along the walls of the furnace are only heating one row of tubes on one side and a refractory wall on the other side, while each of the inner rows of burners is heating two rows of tubes, one on each side of the inner burner row. Therefore, the outer burners need to provide less power than the inner burners.

The main objective of the furnace design (also known as firebox design)—and of its use as well—is to maximize the heat transferred to the tubes, from the burner flames, from the walls and also from the hot flue gas while respecting a tube maximal operating temperature constraint. The tube maximal operating temperature or MOT (also known as maximal operating constraint) is a function of several factors, and particularly of the tube mechanical load (mainly feed gas pressure), of the mechanical properties of the alloys used for the tubes and of the desired lifetime of the tubes exposed to creep and thermal aging.

Any intensification of the heat transferred to the tubes has a direct positive impact, either it allows increasing the productivity or it allows improving the compactness of the firebox which is valuable in terms of capital expenditures. However, intensification of the heat transferred usually implies higher tube skin temperature levels that reduce tube lifetime or require more resistant alloys, which are much more expensive.

Any lack of homogeneity in the heat duty distribution in the furnace will lead some of the tubes to be hotter than other ones, that is why the temperature profiles of the tubes are critical elements for the design of the furnace and during operation; the tube temperature profiles provide decisive information when looking for good compromise between performance and durability, a good compromise being actually essential.

Remark: when considering the tube temperature profile, it is to be noted that the temperature considered is in fact the tube skin temperature or TST, (also known as tube wall temperature or TWT), often simply called tube temperature.

During operations, the durability of the furnace is limited by the temperature of the hottest tube (known also as maximum tube temperature or MTT); this temperature should not be hotter than the MOT. In the meantime, the performance of the process, i.e. efficiency of conversion, depends on the average tubes heat flux and temperatures. Therefore, the smaller is the difference between the temperature of the hottest tube and the temperature of the coldest tube, the better is the performance of the furnace.

The furnace design constraints lead to an inherent outcome: an inhomogeneous transfer of the available heat among the rows of tubes. The main reason for this inhomogeneous transfer is the difference in the discharging combustion products momentum flux between the outer burners and the inner burners (burners of the outer rows of burners and burners of the inner rows of burners). Indeed, the outer burners that see reforming tubes only on one side are commonly operated at lower firing rate, usually between 45% to 80% of the firing rate of the inner burners having tubes on both sides of the row.

The differences in the firing rates between outer and inner burners, and thus the differences in the mass flow rate, imply that the discharging combustion products from outer burners have also lower momentum flux than the discharging combustion products from inner burners. The outer burner flames will be deflected towards the middle of the reformer (effect also known as "flame bending") making difficult to equilibrate the heat duty among the reforming tube rows.

This problem of the bending of outer burner flames towards inner burners flames is known, however it is not properly solved.

The problem of outer burner flames bending towards inner burners' flames is known and has been documented in the art for down-fired reformers. The same problem occurs in up-fired reformer and is not so different in that case; the difference between the flame behavior in down-fired reformers and the flame behavior in up-fired reformer being only due to some marginal buoyancy effects.

Solutions have been proposed by the prior art to correct the problem of the bending of the flames. They mainly refer to top-fired reformers.

Most of them require important modifications in relation with the firing system, either with the burner itself or with the burner distribution manifolds. For example:

in US 2007/0099141 A1 and in EP 2 369 229 A2 a plurality of (oxidants/fuel) conduits are added to the burners so as to modify the behavior of the flames;

in US 2007/0128091 A1, the inclination of at least the outer burner nozzles is modified;

in US 2015/0239736 A1, the outer burners velocity discharge is modified to be higher than the discharge velocity of the inner burners.

In EP 2 708 812 A1, another solution is proposed; a down-fired reformer and a method for operating the same are disclosed, wherein, as usually, the burners are placed in rows between the rows of tubes, and also at the furnace side, along the walls of the furnace parallel to the rows of tubes. According to the solution as disclosed, in order to prevent the outer burner flames bending towards inner burners' flames, the outer burners should be positioned close to the furnace walls, more specifically, the outer burners and outer tubes should be positioned such that the distance of the central axis of the outer burner to the furnace wall is less than 25%, preferably 10%, more preferably 5%, most preferably 2% of the distance between the outermost tubes and the furnace wall.

There remains therefore a need for improving the uniformity of the heat duty transferred among the rows of tubes in the furnaces—both up and down fired furnaces—used for reforming process and other endothermic processes as well, and thus to gain in plant efficiency and safety.

It has been found in fact that if the positioning of the outer burners closer to the wall than in usual practice—according to the teaching of EP 2 708 812 A1—allows to decrease the flame bending and to improve the homogeneity of the temperatures, the distance between the outer tubes and the furnace wall does not seem to affect the behavior of the flame.

It has been put forward that in fact, the burners of outer rows are to be installed close to the alongside walls i.e. along X axis; however, it has also be found that the distance between said wall and the outer burner is to be defined not in relation with the distance between the outer tubes and the wall parallel to the outer tube rows, but in relation with the outer burner nozzle dimension (refer to FIG. 5).

There are different burner nozzle geometries, more or less complex, with usually several nozzles (also known as tips) to inject the air and one or several nozzles (or tips) to inject the fuel (or mixture of fuel) in the furnace.

For complex burner geometry, an "equivalent burner nozzle diameter" has been defined in the context of the invention. As the area(s) of nozzles for injecting air are much larger than the areas of nozzles for injecting fuel, the "equivalent burner nozzle diameter"—according to the invention—has been defined as the diameter of a disk which area is the sum of the areas of the nozzles to inject the air.

For circular or quadrilateral burner geometry, the "equivalent burner nozzle diameter" has been defined in the context of this invention as the maximum size of the air nozzle in the direction perpendicular to the wall.

SUMMARY OF THE INVENTION

The aim of the invention is to improve the prevention of the outer burners flames bending towards the inner burners flames in a vertically-fired (either up or down) reformer. The flame bending is prevented thanks to a reduction of the distance between the outer burners and the adjacent wall (alongside wall) in relation with the size of the said outer burners—estimated by the equivalent burner nozzle diameter in the context of the invention—, allowing thus the outer burner flame to be stuck to the wall.

It is therefore an object of the invention to propose a furnace for performing an endothermic process comprising tubes containing a catalyst for converting gaseous feed, wherein tubes are positioned inside the furnace in rows parallel to refractory walls referred to as walls along X axis, wherein burners are mounted either to the furnace floor or to the furnace ceiling, inner burners being mounted in rows between the rows of tubes and outer burners being mounted in rows between tubes rows and the walls along X axis, and close to said walls along X axis, characterized in that the outer burners are positioned such that the distance b2w between the outer burner and the closest wall along X axis is smaller than or equal to the equivalent burner nozzle diameter øb of said outer burner (i.e. b2w/øb≤1), with said equivalent burner nozzle diameter being equal to the diameter of a disk which area is the sum of the area of the nozzles for air injection in the case of complex burner geometry or the maximum size of the air nozzle in the direction perpendicular to the wall in the case of circular or a quadrilateral burner geometry.

According to an alternative of the invention, in order for the furnace to be advantageously used at loads lower than 50% of nominal load, the ratio b2w/øb is ≤0.8.

Preferably, the ratio b2w/øb is 0.60 so as to prevent the overheating of the refractory wall along X axis by more than 50° C.

For a furnace according to the invention intended to be used with loads higher than 50% of nominal load while preventing the overheat of the refractory wall by more than 50° C., the ratio b2w/øb is such that 0.6≤b2w/øb≤1.

According to another aspect, the invention relates to an endothermic process to be performed in a furnace comprising tubes and burners, said process comprising:

introducing gaseous feed and steam to tubes containing catalyst for converting a gaseous feed, wherein tubes are positioned inside the furnace in rows parallel to refractory walls along X axis, combusting fuel with air in burners that are mounted either to the furnace floor or to the furnace ceiling, inner burners being mounted in rows between the rows of tubes and outer burners being mounted in rows between tubes rows and the wall along X axis, and close to said wall along X axis, discharging products generated in the tubes, wherein the outer burners are positioned such that the distance b2w between the outer burner and the wall along X axis is smaller than or equal to the equivalent burner nozzle diameter øb of said outer burner (b2w/øb≤1), with said equivalent burner nozzle diameter being equal to the diameter of a disk which area is the sum of the area of the nozzle for air injection of the burner in the case of complex air injection geometry or the maximum size of the air nozzle in the direction perpendicular to the wall along X axis in the case of circular or a quadrilateral burner geometry.

In addition, the process of the invention can be—taken alone or in combination:
a steam methane reforming process;
a process suitable to be implemented in any furnace of the invention.

BRIEF DESCRIPTION OF THE DRAWINGS

Further features, advantages and possible applications of the invention are apparent from the following description of working and numerical examples and from the drawings. All described and/or depicted features on their own or in any desired combination form the subject matter of the invention, irrespective of the way in which they are combined in the claims the way in which said claims refer back to one another.

FIG. 2 shows a bottom view of an up-fired furnace, highlighting tubes and burners organization, as well as a representative domain (or representative bay);

FIG. 3b shows the flame jets behavior for the four different localizations of the outer burner of the representative bay presented on FIG. 3a;

FIG. 6b shows the flame jets behaviors corresponding to the additional examples of FIG. 6a;

FIG. 7 is a table reporting the occurrence of flame bending (Yes/No) in relation with various parameters that characterize the localization of the outer burners including the ratio (distance burner to wall/diameter of the burners) and (distance center of the burner to wall/distance tube to wall);

DETAILED DESCRIPTION OF THE INVENTION

Figure 1:
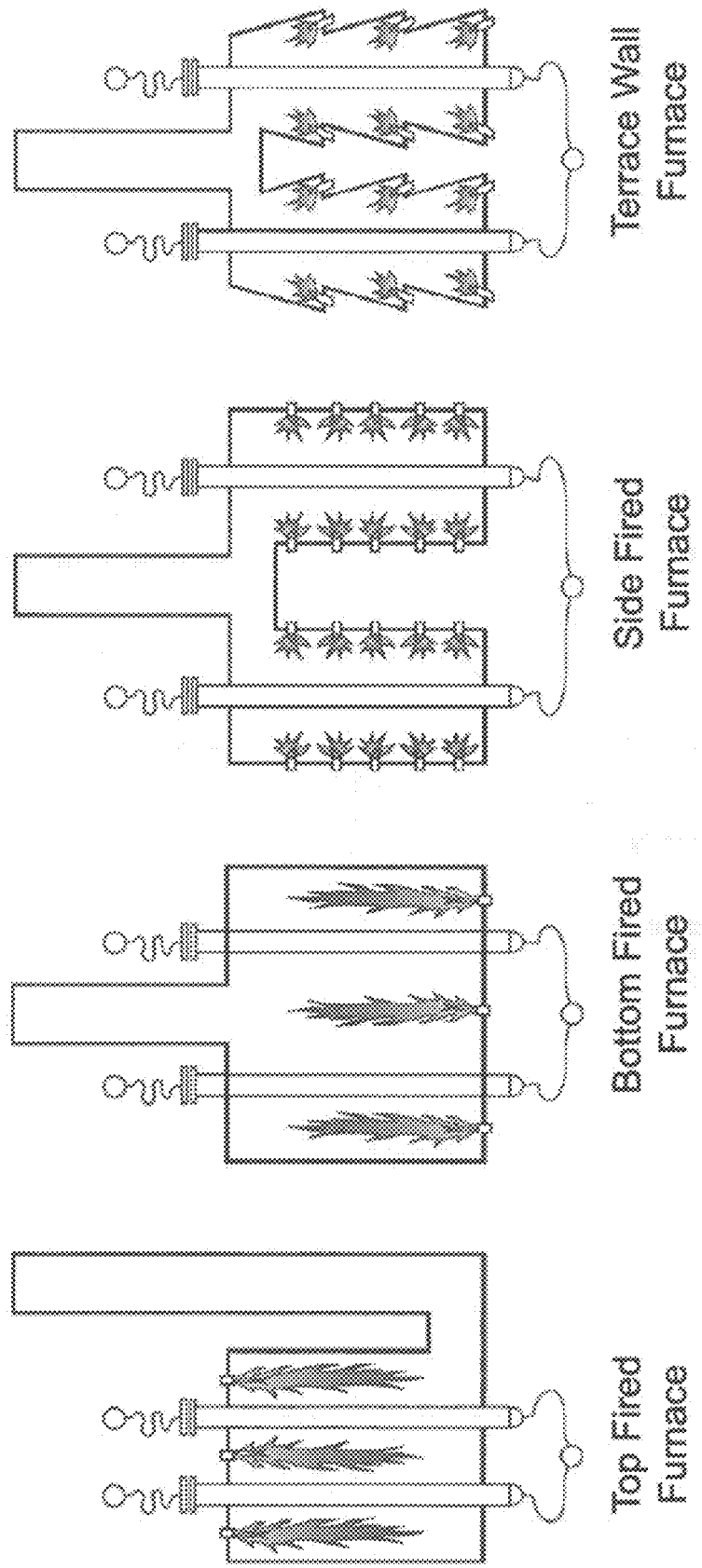
FIG. 1 shows the position of the burners for typical furnace designs.

The objective of this invention is to improve the vertically-fired SMR efficiency by preventing the outer burners flames bending towards the inner burners flames. Thanks to the invention, local tube temperature in-homogeneities will be avoided; the tube temperature vertical profile will be controlled, allowing maintaining high temperature all along the tube length and thus high process gas conversions. For reformers with at least three rows of tubes, the invention will contribute to mitigate the temperature differences between the rows.

In order to be able to identify and propose a solution to prevent the occurrence of the flame bending, numerical simulations utilizing computational fluid dynamics (CFD) have been made to estimate the impact of the distance between outer burners and their alongside wall on the flame bending occurrence.

The simulations are made in reference to the figures which present an up-fired rectangular furnace (the invention is however intended to apply to all type of vertically-fired furnaces, with process gas flowing co-currently or counter-currently).

Burners are represented as squares. As explained above and apparent on the figures, for square representation, the "equivalent burner diameter" is the side of the square, —the denomination "equivalent diameter" being however maintained.

The CFD simulations are made for a reduced size 3-D domain representative of an up-fired furnace using a solver intended for calculation of the heat transfer between the combustion chamber-for which a 3-D model is used—, and the tubular catalytic reactors—for which a 1-D model is used that takes into account the kinetics of the reforming reactions.

Reading the following more detailed description of the examples and of the figures will help understanding the invention.

FIG. 2 presents a bottom view of an up-fired type furnace with two rows of fifty tubes each being arranged in three sections of sixteen, eighteen in the central section and sixteen tubes, and three rows of fifteen burners each, arranged in three sections of five burners, with the burners rows being parallel to the tubes rows and to X axis.

The rows of burners are organized in two outer rows of burners (named also outer burners 1a) situated along a wall 4 and one inner row of burners (known as inner burners 1b), and two rows 2 of tubes (named also outer tubes 3). The inner burners row is surrounded on each side by a row 2 of outer tubes 3.

Due to this arrangement of burners and tubes, it is common practice in the art to run outer burners 1a—which heat up a single row of tubes—at lower power than the inner burners 1b which heat up two rows of tubes. For the examples presented, all calculations have been made with an outer burner 1a power of 55% of the inner burner 1b power.

Each outer burners row is situated along and parallel to a wall 4 (wall along X axis also identified in the text as "longitudinal wall" or "alongside wall") and each burner row is ended by a wall 5 (wall along Y axis also identified as "end wall"). According to usual firebox design, the distance between each of the outer burner 1a and the alongside wall 4 close to the outer burner row is chosen sufficient so as to avoid the hot combustion products discharged by the outer burners to interact with the alongside wall. Usual values for said distances are between 0.5 m to 1 m—this being of course to be considered in relation with the distance between two rows of burners, which is usually around 2 m—for installation and maintenance convenience.

According to the invention, outer burners 1a will have to be positioned closer to the alongside wall 4 than usually practiced to ensure the interaction between the combustion products discharged by the outer burner and the alongside wall. The distance between a burner of the outer burner row and the alongside wall 4 is identified as "b2w". It is measured as the smallest distance between the wall 4 and the outer burner 1a.

The representative domain 6 is used for the CFD computations, it is emphasized as a grey rectangle on FIG. 2, and it contains three adjacent outer tubes 3, flanked by an outer burner 1a on one side and a half inner burner 1b on the other side.

As stated previously in the text, the distance between the outer burner and the alongside wall 4 has been identified in prior art EP 2 7080812 A1 as having a great influence on the behavior of the heat flux.

According to said prior art, in order to improve the behavior of a top fired furnace—in terms of efficiency and reliability—, the optimal distance between outer burners and the alongside wall will depend on the distance between the wall and outer tubes row.

In the examples presented to illustrate this invention, the various simulations performed have been applied to an up fired furnace with three rows of burners—two outer rows and one inner row—and two rows of tubes in the furnace.

Figure 3A:
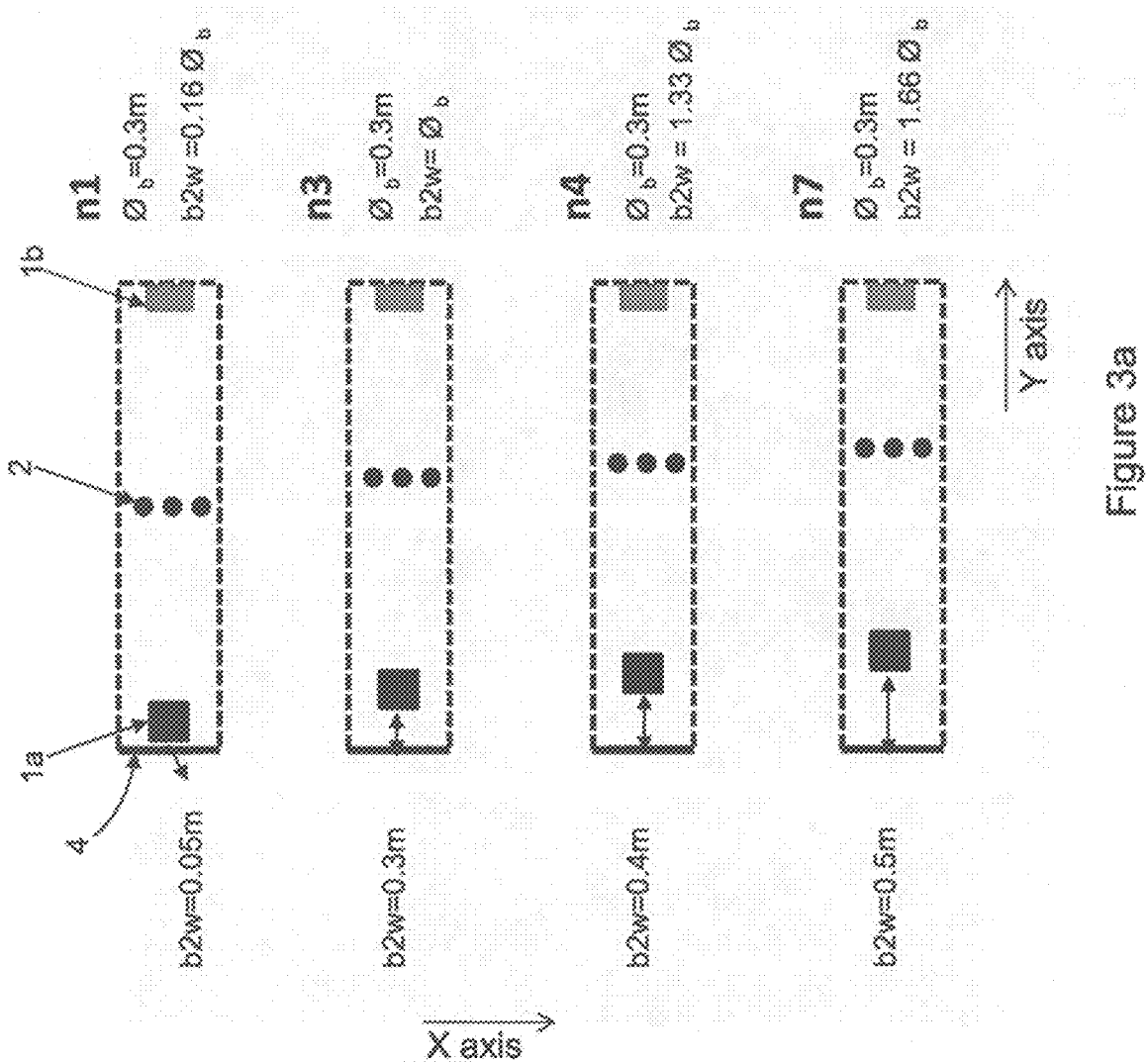
FIG. 3a shows four different localizations for the outer burner of the representative domain presented on FIG. 2.

FIG. 3a shows four representations of the domain 6 defined in the FIG. 2, with four examples of different locations for the outer burner 1a—more precisely, four different distances b2w—; a symmetry plane parallel to the wall 4 is ending the domain; it cuts the inner burner 1b in its middle. The equivalent burner nozzle diameter "øb" of the outer burner is kept the same for the 4 cases with øb=0.3 m.

Figure 3B:
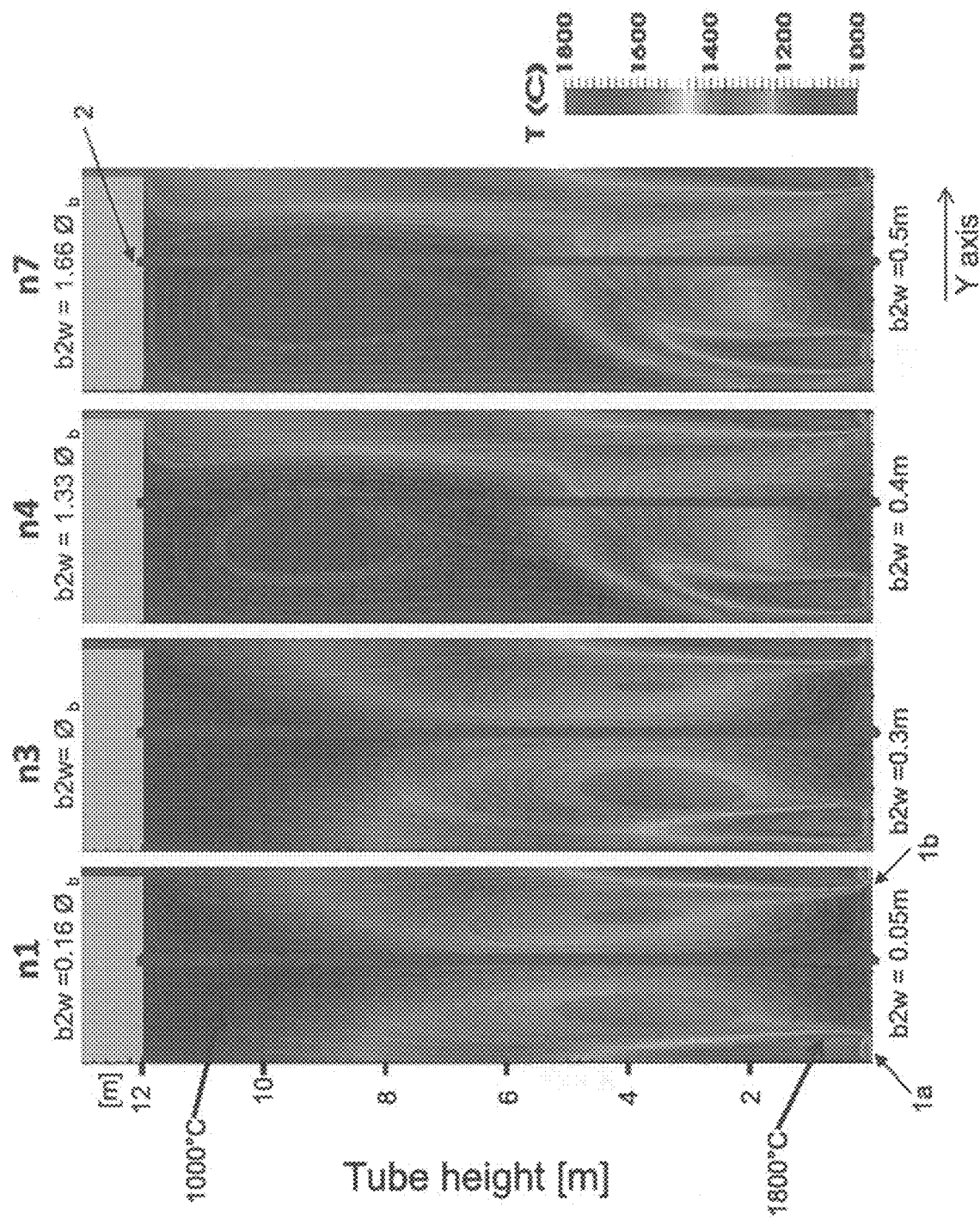

FIG. 3b presents four temperature fields in a vertical section plane parallel to Y-axis and cutting the burners in their middle. The temperature fields result from the above cited numerical simulations applied to the representative domain 6 shown on FIG. 2, for the same four distances b2w from the outer burners to the alongside wall, and the same outer equivalent burner nozzle diameter øb as the one indicated in FIG. 3a referenced as n1, n3, n4, n7. The zones where the temperatures are the highest and the zones where the temperatures are the lowest are indicated on the figure.

In view of the results of the CFD simulation presented on FIG. 3b, it appears that the behavior of the flames changes when the outer burner distance to the alongside wall 4 reaches the equivalent burner nozzle diameter (i.e. when b2w/øb=1), as detailed hereafter.

For b2w=0.5 m (and consequently b2w/øb=1.66) which is a distance commonly found in usual practiced reformers, the results of the simulation presented on FIG. 3b show that the outer burner flames are deflected towards the inner burners.

The outer burner being operated at 55% firing rate of the inner burners—and thus having a lower momentum flux than the inner burner—, is aspirated towards it. A large recirculation zone of gases is also created that extends to and crosses the reforming tube row and therefore induces undesirable transfer of energy to the inner tubes rows (not shown).

For b2w=0.4 m (and consequently b2w/øb=1.3), deflection of the outer burner flame towards the inner burner is observed as well, as in usual practice reformers.

For the example with b2w=0.3 m (and consequently b2w/øb=1), the outer burner flames are no longer deflected towards the inner burners. In the mean time the recirculation zone of the gases is limited to the area between the burner and the tube row, without crossing of the tube row (not shown).

For even lower distance between the outer burner and the wall 4, with b2w=0.05 m (and consequently b2w/øb=0.16), the outer burners flames (and gases as well) are sticking to the wall 4.

Figure 4:
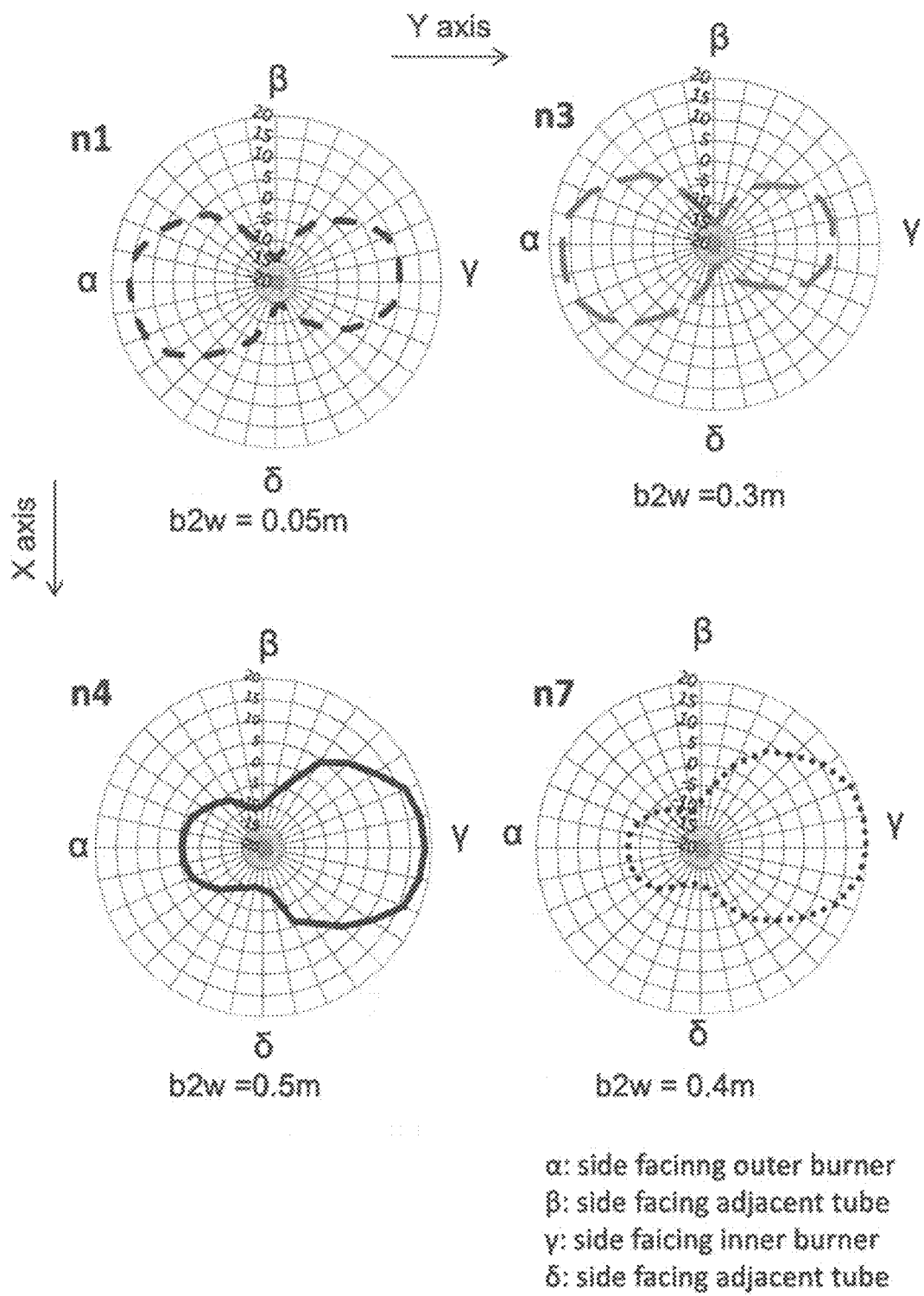
FIG. 4 illustrates the variation of the tube temperature around the circumference for the examples presented on FIGS. 3a and 3b.

FIG. 4 illustrates the difference between the tube temperature—locally all around its circumference—and the average tube temperature (local temperature also identified as circumferential temperature), at half of the tube height—i.e. 6 m height, the tube having 12 m height—for the middle tube of the representative domain 6 and for the same four examples presented on FIGS. 3a and 3b with the references n1, n3, n4, n7.

It can be observed that the flame bending impacts the profile of the circumferential tube temperature:

for the four examples, the side α of the tube and the opposite side γ facing the burners—respectively outer burner and inner burner—are hotter than the average tube temperature, the temperatures of the two other sides β and δ facing the adjacent tubes being lower than the average tube temperature;

for both the two examples n4 and n7 where flame bending is observed, and due to the hot gases crossing the tube row when the flames bend, the side a of the tube facing the outer burner and the opposite side γ of the tube (facing the inner burner) show a temperature difference close to 20° C. in-between;

on the other hand, for the two examples n1 and n3 with the flame stuck to the wall—i.e. without bending—, the difference between the temperature of the side a of the tube facing the outer burner and the temperature of the side γ of the tube opposite to the outer burner is close to 5° C.;

in the meantime, the temperatures of the two other sides β and δ facing the adjacent tubes are not directly impacted by the bending of the flames and remain 10 to 15° lower than the average tube temperature.

Based upon the above results which have been obtained using the same reformer load (corresponding to the nominal load), it appears that the flame bending has a binary-response (Yes or No) depending on the ratio between the outer burner distance to alongside wall and the equivalent burner nozzle diameter: b2w/øb. No intermediate state has been observed between the two modes: flame deflection and flame sticking to the wall. Nevertheless, at the limit between the two modes, it may exist a critical ratio around b2w/øb=1 for which the flames fluctuate between bending and sticking to the wall, situation that could not be put in evidence with the stationary CFD simulations.

According to the invention, it is therefore necessary to install the outer burners 1a closer to the longitudinal wall 4 in conventional configurations, but this is not the only constraint to follow. An additional parameter is to be considered in combination with b2w, which is not t2w (distance between the alongside wall and the outer tube row) as taught by EP 2 708 812 A1.

According to the present invention, the second parameter which must be taken into consideration, in combination with the distance b2w, deals with the burner and not with the tubes; more precisely, said second parameter estimates the dimension of the burner; in the context of the invention, the parameter that estimates the dimension of the burner expresses this dimension as the "equivalent burner nozzle diameter". The way the value of the "equivalent burner nozzle diameter" is calculated according to the invention has been disclosed previously in the text.

More exactly, as put forward by the examples, the two parameters have to be considered in combination, in the form of the ratio between the distance between the outer burner row and the wall along X axis: b2w and the equivalent burner nozzle diameter: b2w/øb.

Figure 5:
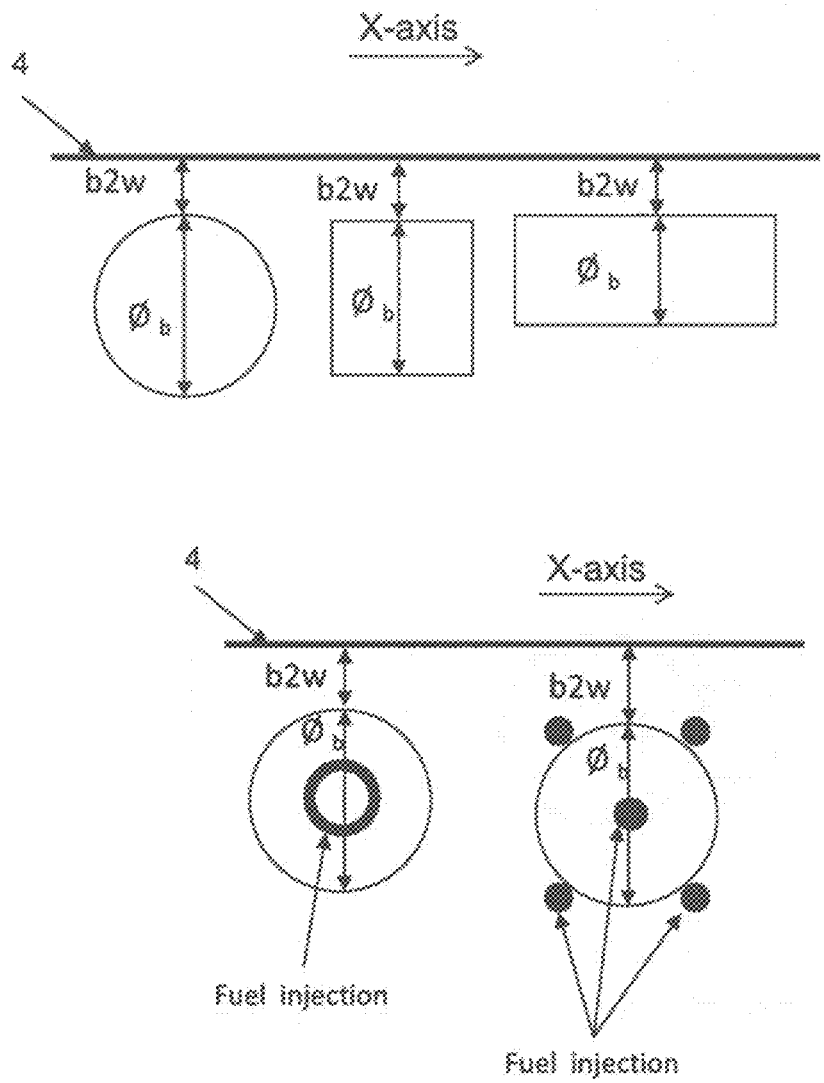
FIG. 5 presents different schematized models of burner nozzle.

On FIG. 5 are presented different schematized models of burner nozzle for burners adjacent to a wall 4, for each case, the "equivalent burner nozzle diameter" and the distance b2w are represented.

For a circular or a quadrilateral burner, the equivalent burner nozzle diameter øb has been defined—in the context of this invention—as the maximum size of the air nozzle in the direction perpendicular to the wall. The fuel nozzles surface being smaller than the air nozzles surface in all cases is neglected—typically 10 to 20 times smaller.

For complex burner geometry, an "equivalent burner nozzle diameter" has been defined in the context of the invention. As the surfaces of nozzles for injecting air are much larger that the surfaces of nozzles for injecting fuel, the "equivalent burner nozzle diameter" of a burner—according to the invention—has been defined as the diameter of a disk which area is the sum of the areas of the nozzles to inject the air. The surface of the fuel injection nozzles is as well neglected.

In order to illustrate the invention and to demonstrate that the solution of the invention provides better results that the solution of prior art EP 2 708 812 A1, additional comparative simulations have been made.

Figure 6A:
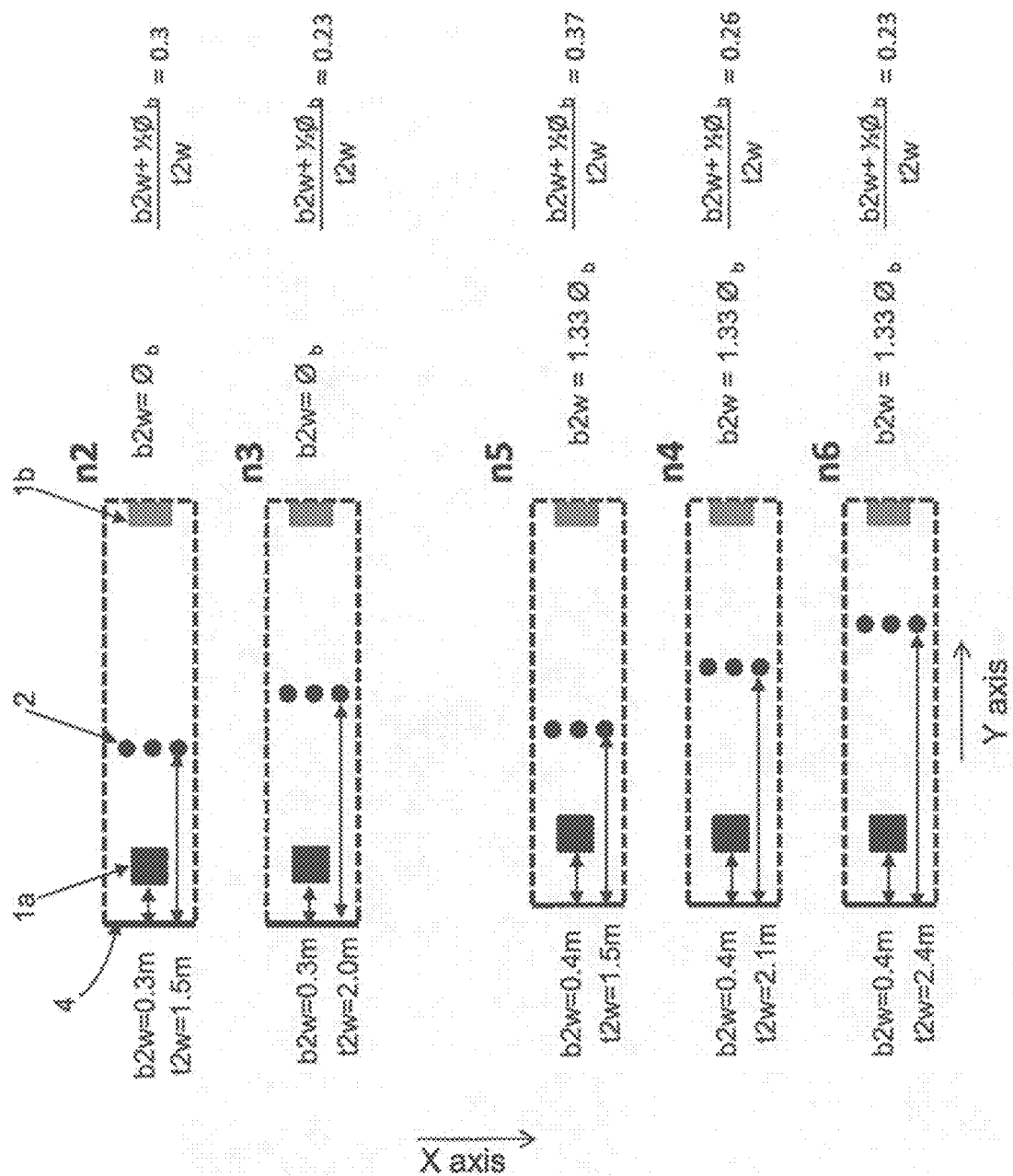
FIG. 6a shows additional examples of localizations of the outer burner in the same representative bay, with both the distance between the wall and the tubes and the distance between the wall and the outer burners varying, while keeping unchanged the burners and the tubes, and therefore their diameters.

FIG. 6a show five examples: n2, n3, n4, n5 and n6 with different localizations of the outer burners 1a and the outer tubes 3; the representative bays and the conditions are the same, excepted for the distance b2w and t2w. The figure includes the two examples n3 and n4 already presented in FIGS. 3a and 3b. Both the distance between the wall and the tubes and the distance between the wall and the outer burner are varying-while keeping unchanged the dimensions of the burner and of the tubes.

Figure 6B:
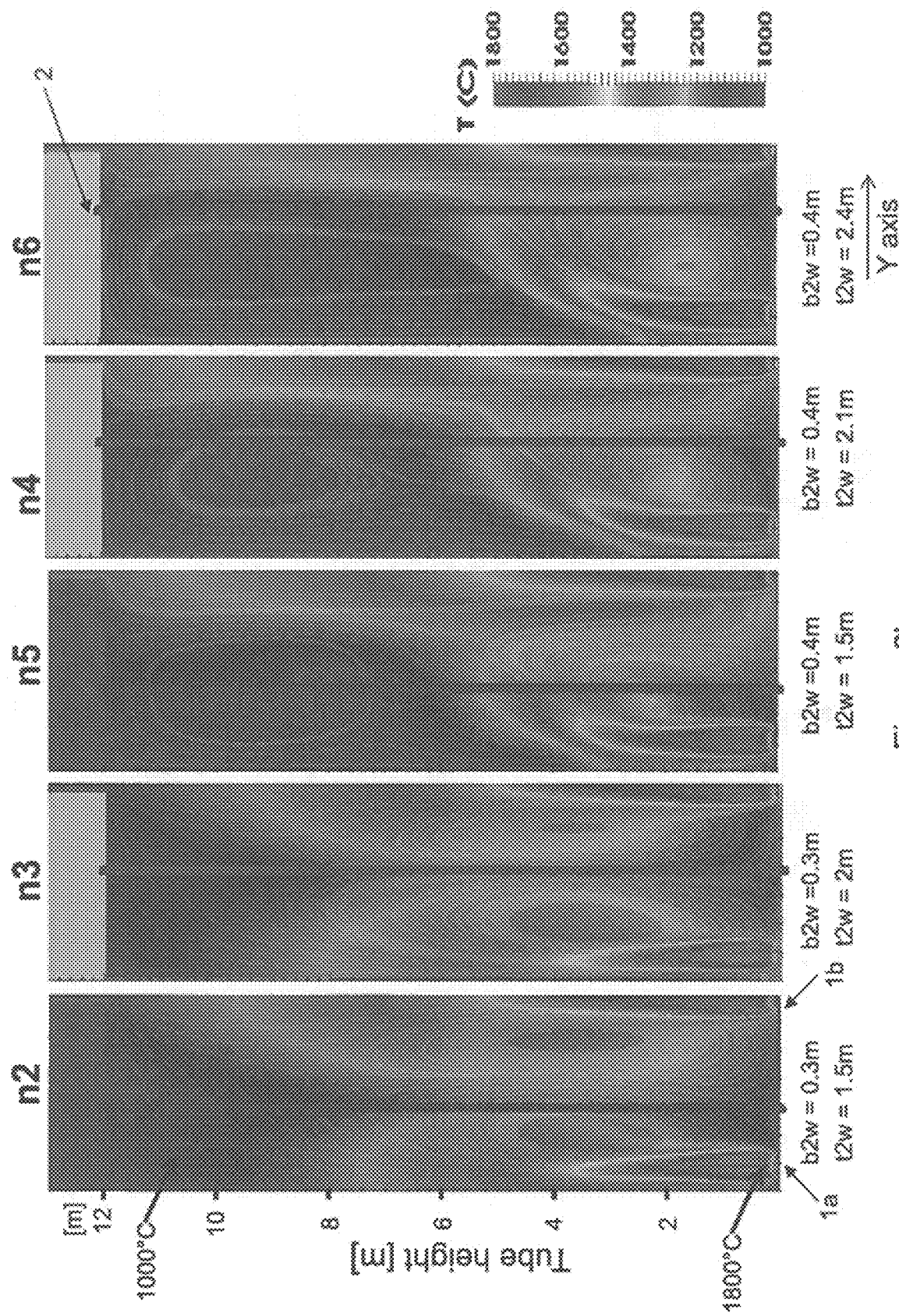

FIG. 6b presents four temperature fields in a vertical section plane parallel to Y-axis and cutting the burners in their middle corresponding to the examples of FIG. 6a with the references n2, n3, n5, n4. FIG. 6b shows the flame jets behaviors, namely the occurrence or the absence of the flame bending.

The comparison of the results of all the examples reported in FIGS. 3 and 6 are presented in the table of FIG. 7.

According to the invention, the data to be considered are:
b2w: distance between the edge of the outer burner nozzle and the alongside wall;
øb: equivalent burner nozzle diameter as defined in the invention;
Ratio: b2w/øb.

Referring now to prior art EP 2 708 812 A1, the data that are considered in said prior art are:
b2w+1/2 øb: distance between the center of the outer burner and the alongside wall;
t2w: distance between the tube and the alongside wall.

The results of the simulations are reported in the table of FIG. 7, where:
Examples n1, n3, n4, n5, n7 follow the rules of both prior art EP 2 708 812 A1 and of the invention: no bending if (b2w+øb/2)/t2w equal to or lower than 0.25 according to prior art and b2w/øb equal to or lower than 1 according to the rules of the invention for n1 and n3, and bending for the three other examples n4, n5 and n7.
Example n2 follows the rules of the invention i.e. no bending with b2w/øb equal to or lower than 1, whereas it does not follow the rules of prior art with (b2w+øb/2)/t2w higher than 0.25 without bending.
Example n6 follows the rules of the invention i.e. bending with (b2w+øb/2)/t2w higher than 1, whereas it does not follow the rules of prior art with a bending of the flame with (b2w+øb/2)/t2w lower than 0.25.

This clearly shows that a good positioning for the outer burners (i.e. close to the alongside wall) depends on the dimension of the burner (estimated, thanks to equivalent burner nozzle diameter), but does not depend on the distance of the wall to the outer tubes row, as previously taught by prior art EP 2 708 812 A1.

Additionally, and In order to take into consideration that if installations are conceived for a nominal load, they are also often planned to be used with a partial load, additional simulations have been performed for partial loads and different values of the ratio b2w/øb, equal to or lower than 1.

Figure 8:
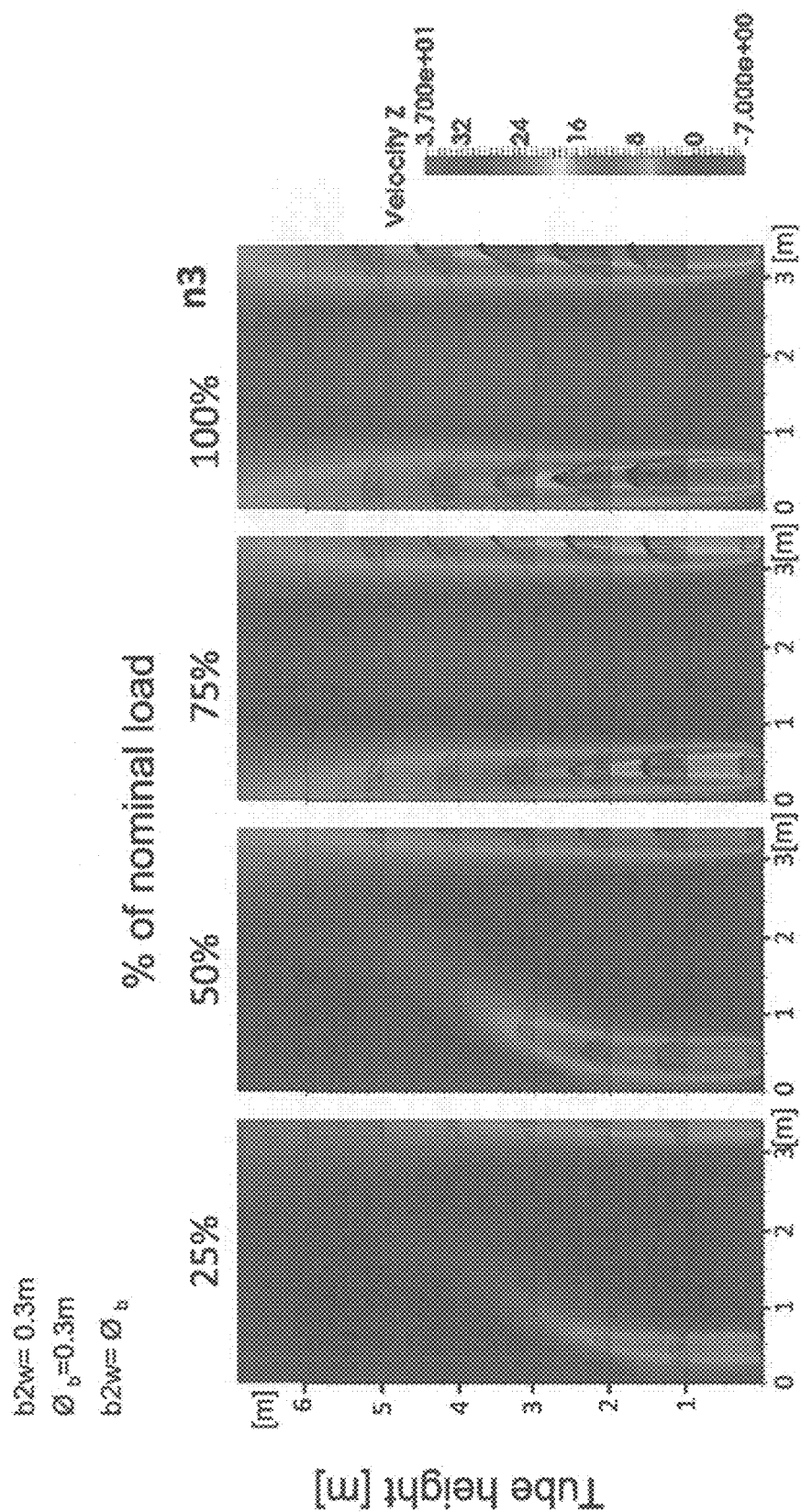
FIG. 8 and FIG. 9 show the influence of the load of the reformer, expressed as % of the nominal feed load-the nominal load being the feed load for which the reformer has been designed—, on the flame bending for two values of the ratio b2w/øb namely 1 and 0.16, respectively. As stated above, the invention aims at proposing an improvement of the design of a vertically-fired type furnace (either up or down) for performing an endothermic process.

FIG. 8 present the effects of a lower load (25%, 50%, 75% of the nominal load), compared with 100% of the nominal load, on the bending of the outer burners flame for b2w/øb=1. It results from these additional simulations that for low loads (i.e. lower than or equal to 50% of the nominal load), the upper limit b2w/øb=1 does not anymore prevent the flames from bending.

Figure 9:
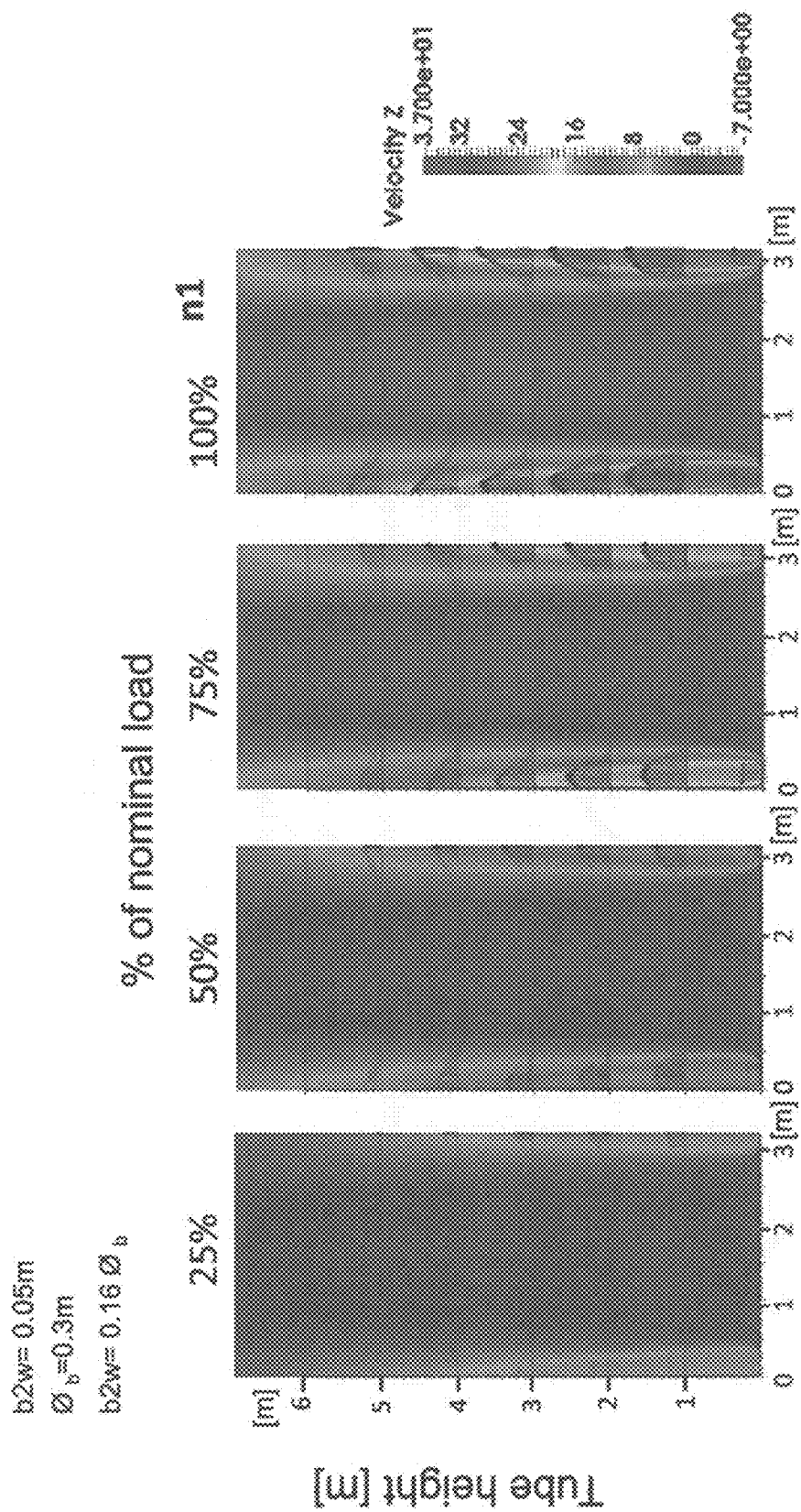

FIG. 9 present the effects of a lower load (25%, 50%, 75% of the nominal load), compared with 100% of the nominal load, on the bending of the outer burners flame for b2w/øb=0.16. It results from these additional simulations that for all loads, the flames stick to the wall.

It may also be advantageous to take into account that if the burners are too close to the walls, the lifetime of refractory lining and cements protecting the wall in the regions close to the outer burner may be reduced due to excessive exposition to flames and to high temperatures. It is therefore better to take into consideration when choosing the refractory lining and cements the stringent conditions imposed (intense radiative and convective heat fluxes at the wall during a very long period, unavoidable chemical reactions at the surface of the refractory and cement occurrence).

Figure 10:
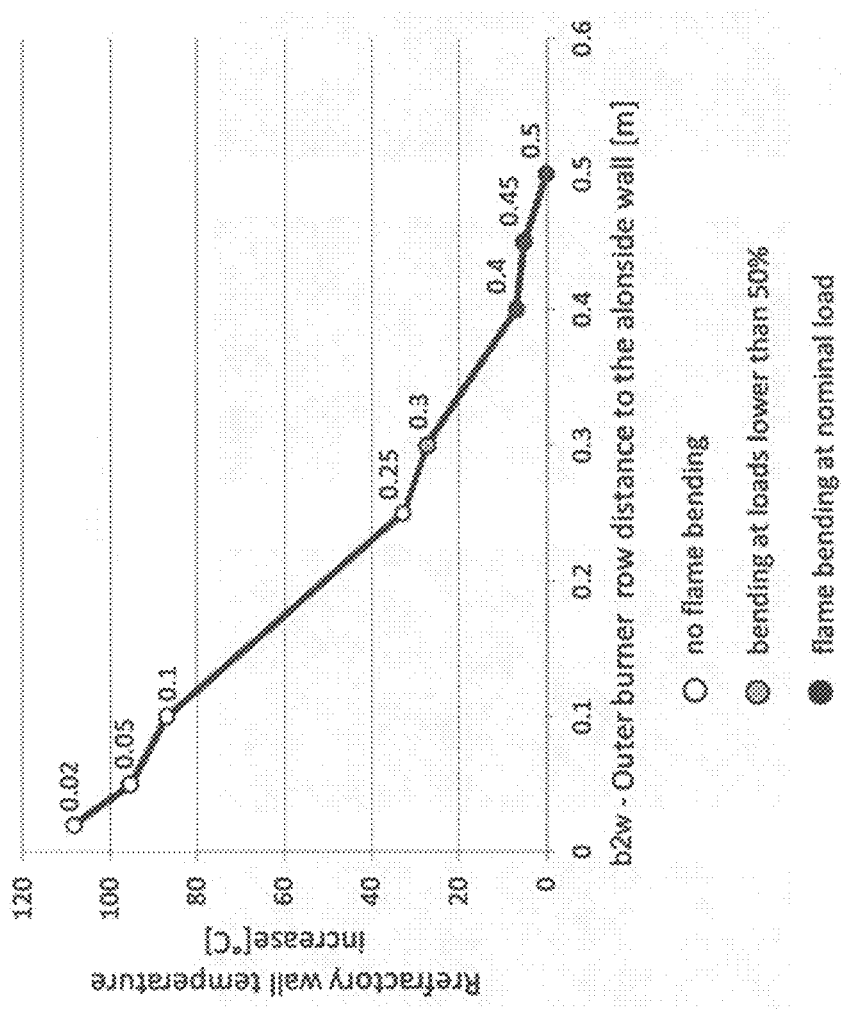
FIG. 10 illustrates the influence of b2w, i.e. the distance burner to wall on the temperature of the refractory wall.

FIG. 10 illustrates how the proximity of the outer burner row and the alongside wall impacts the refractory wall temperature. The refractory wall temperature increases 110° C. when the distance b2w between the outer burner and the alongside wall decreases from the standard value 0.5 m to 0.02 m.

Therefore:
in order to avoid the flame bending occurrence at high loads (more than 50% of the nominal load) and at the meantime the overheat of the refractory wall by more than 50° C. the following criteria should preferably be respected: $0.6 \leq b2w/øb \leq 1$;
alternatively, in order to avoid the flame bending occurrence at both low and high loads and at the meantime the overheat of the refractory wall by more than 50° C. the following criteria should preferably be respected: $0.6 \leq b2w \leq 0.8$.

As an alternative or additional solution to prevent the overheating of the furnace wall, it is also possible to apply locally a high emissivity coating, providing cumulative benefits in terms of efficiency, capital expenditure and operational expenditure.

Among the advantages of using outer burners with flame sticking to the wall for a vertically fired reformer—either up fired or down fired-, according to the present invention, we shall give:
by preventing the outer flame bending, the heat transfer to the tubes is more homogenous, and thus optimized;
the outer burner row being closer to the walls than usual, the firebox width will be reduced, and thus capital expenditures.

for small reformers, this can be particularly advantageous, facilitating for example the transportation.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A furnace configured to perform an endothermic process, the furnace comprising:
    tubes containing catalyst for converting gaseous feed, wherein the tubes are positioned inside the furnace in rows parallel to refractory walls along an X-axis, burners mounted to a furnace floor, wherein the burners further comprise inner burners being mounted in rows between the rows of tubes and outer burners being mounted in rows between rows of tubes and the wall along the X-axis, and close to said wall along the X-axis, wherein the outer burners are positioned such that a distance between the outer burner and the wall along the X-axis ("B2W") is smaller than or equal to an equivalent burner nozzle diameter ("øb") of said outer burner (B2W/øb≤1), with said equivalent burner nozzle diameter being equal to a diameter of a disk, which area is a sum of an area of nozzles for air injection of the burner in a case of complex air injection geometry or a maximum size of an air nozzle in a direction perpendicular to the wall along the X-axis in a case of circular or a quadrilateral burner geometry,
    wherein B2W/øb≥0.60 so as to prevent overheat of the refractory wall by more than 50° C.

2. The furnace according to claim 1, wherein if the furnace is configured to be used at feed loads lower than 50% of nominal load: B2W/øb≤0.8.

3. The furnace according to claim 1, wherein if the furnace is configured to be used at loads higher than 50% of nominal load: 0.6≤B2W/øb≤1, so as to prevent overheat of the refractory wall by more than 50° C.

4. An endothermic process to be performed in a furnace, said process comprising the steps of:
    introducing a gaseous feed and steam to tubes containing catalyst configured to convert the gaseous feed, wherein the tubes are positioned inside the furnace in rows parallel to refractory walls along an X-axis,
    combusting a fuel in the presence of an oxidant in burners that are mounted to a furnace floor, wherein the burners further comprise inner burners being mounted in rows between the rows of tubes and outer burners being mounted in rows between rows of tubes and the wall along the X-axis, and close to said wall along the X-axis,
    discharging products generated in the tubes, wherein the outer burners are positioned such that the distance ("B2W") between the outer burner and the wall along the X-axis is smaller than or equal to an equivalent burner nozzle diameter ("øb") of said outer burner (B2W/øb≤1), with said equivalent burner nozzle diameter being equal to a diameter of a disk, which area is a sum of an area of a nozzle for air injection of the burner in a case of complex air injection geometry or a maximum size of an air nozzle in a direction perpendicular to the wall along the X-axis in a case of circular or a quadrilateral burner geometry,
    wherein B2W/øb≥0.60 so as to prevent overheat of the refractory wall by more than 50° C.

5. The endothermic process as claimed in claim 4, wherein the endothermic process is steam methane reforming.

6. The endothermic process as claimed in claim 4, wherein if the furnace is configured to be used at feed loads lower than 50% of nominal load: B2W/øb≤0.8.

7. The endothermic process as claimed in claim 4, wherein if the furnace is configured to be used at loads higher than 50% of nominal load: 0.6≤B2W/øb≤1, so as to prevent overheat of the refractory wall by more than 50° C.

* * * * *